Jan. 16, 1951     A. J. COLLINS     2,538,084
METER READING CARD CASE
Filed Aug. 14, 1947     4 Sheets-Sheet 1
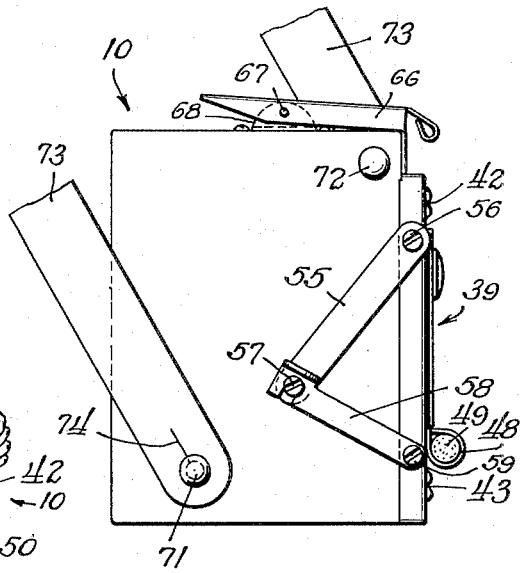
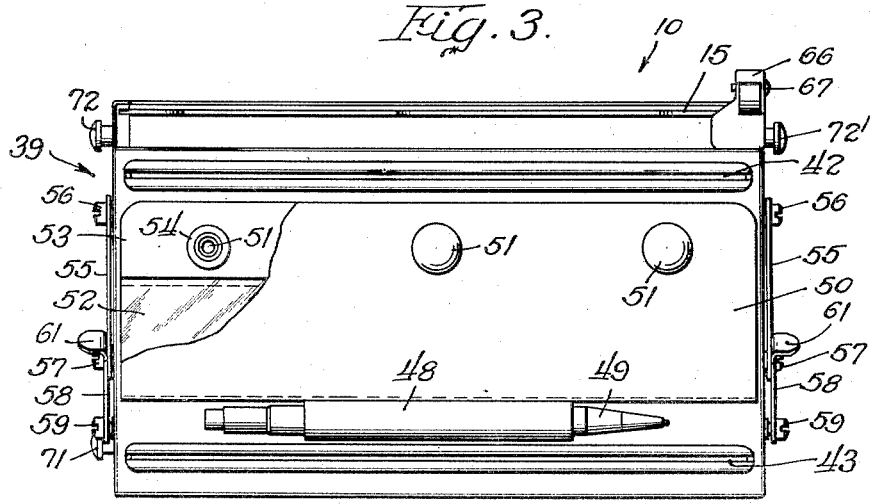
Inventor:
Albert J. Collins
By Brown, Jackson, Boettcher & Dienner
Attys.

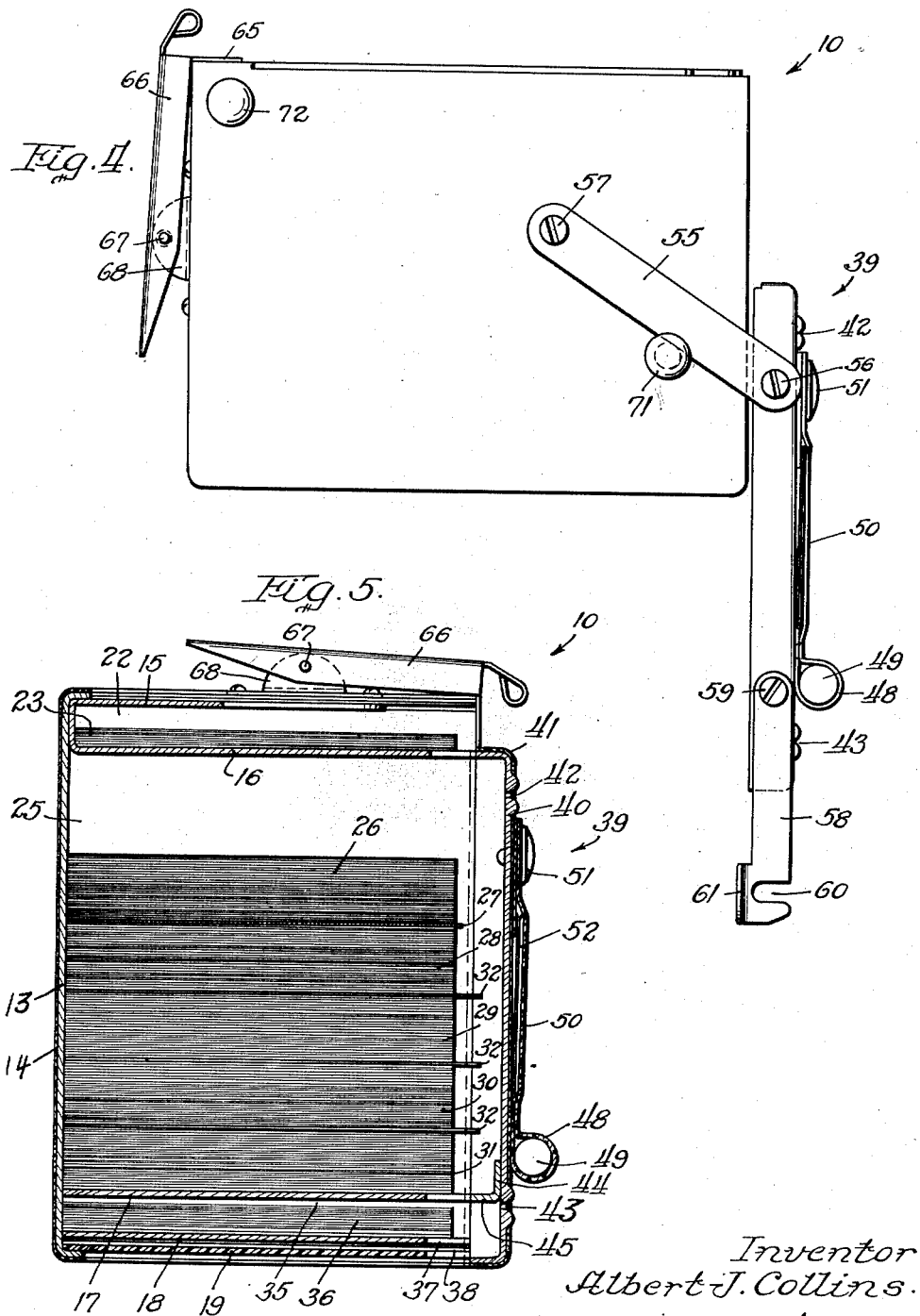

Inventor:
Albert J. Collins
By Brown, Jackson, Boettcher & Dienner
Attys.

Jan. 16, 1951 A. J. COLLINS 2,538,084
METER READING CARD CASE
Filed Aug. 14, 1947 4 Sheets-Sheet 4
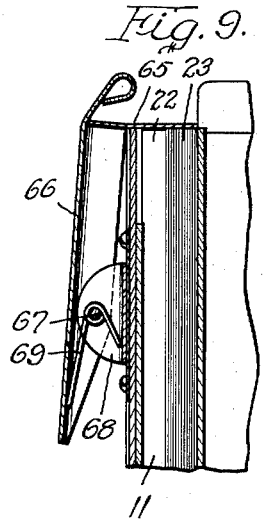
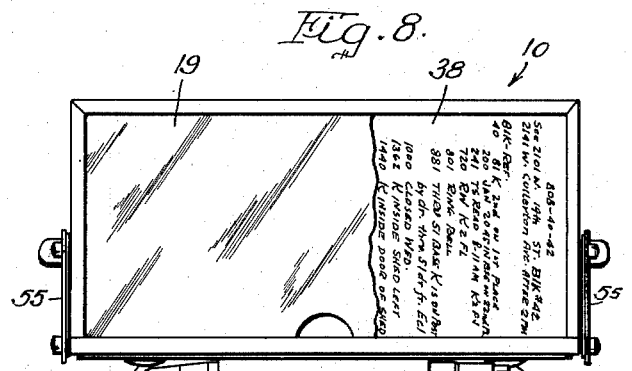
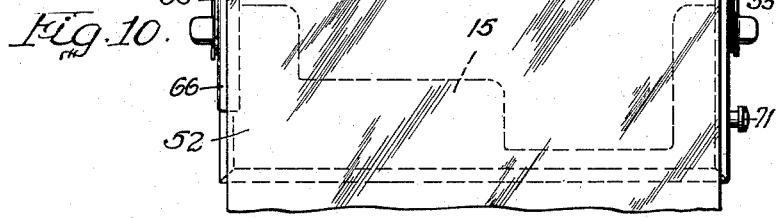
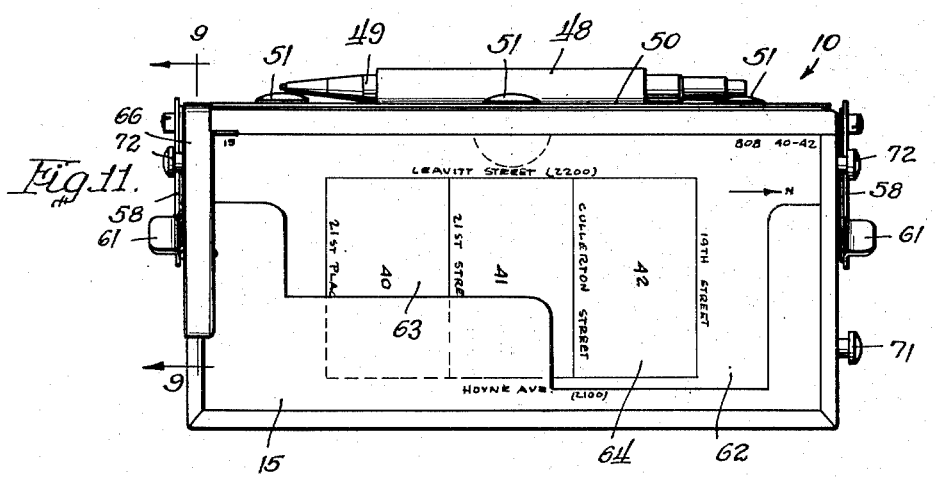
Inventor:
Albert J. Collins.
By Brown, Jackson, Boettcher & Dienner
Attys.

Patented Jan. 16, 1951

2,538,084

UNITED STATES PATENT OFFICE 2,538,084

METER READING CARD CASE

Albert J. Collins, Chicago, Ill.

Application August 14, 1947, Serial No. 768,627

3 Claims. (Cl. 281—44)

My invention relates, generally, to tabulating card containers and it has particular relation to cases for such cards which are carried by a meter reader for marking thereon the reading of a meter such as an electricity, gas or water meter.

The problem of billing for service rendered consumers by public utility systems, for example, systems supplying customers with electrical energy, is becoming increasingly more difficult for various reasons. Among them are the increased cost in preparing the conventional monthly statement as a result of increase in salary paid to personnel preparing the same. The accompanying overhead cost also is increasing and, as the utility system grows and customers are added, additional personnel is required for preparing the monthly statements. This results in the demand for increased office space which, in many instances, is not available or is available only at excessive cost.

As a result of these and other factors business machines have been devised and adapted to perform mechanically and electrically the operations which, heretofore, have been performed by the personnel of a biilling department of the utility. The practice is to perforate a tabulating card for each customer with certain information thereon and to typewrite or otherwise indicate thereon certain information such as the name and address of the customer, the amount of the previous meter reading and special information that is of use to the meter reader in obtaining the meter reading. It is the usual practice to prepare a card for each meter reading. Each card is provided with a series of digits from zero to nine, each series corresponding to a meter dial. The meter reader notes the position of the hands of the meter and records them individually on the corresponding tabulating card by means of a special pencil that is formed of material which leaves a mark on the card having a relatively high electrical conductivity.

The previously perforated tabulating card thus marked is processed through the tabulating machines by means of which the monthly statement is prepared using as the basis the information punched and marked on the card.

One of the problems that is involved in such a system of billing is the handling of the tabulating cards by the meter reader. It is essential that they be kept free from any foreign markings and that they be maintained in a substantially flat condition. If this is not done, difficulty may be encountered in processing the card through the tabulating machines. Also the cards must be kept dry. They should be maintained in proper order so that the meter man can readily and quickly have available the card corresponding to the particular meter which he wishes to read. As indicated hereinbefore, it is to the provision of means for carrying tabulating cards for meter reading purposes that my invention is addressed particularly.

Accordingly, among the objects of my invention are: To hold a stack of tabulating cards in proper sequence so that they can be marked individually by a meter reader as he progresses from one meter to the next; to provide a space which can be used for receiving the cards on which the meter reading has been marked; to provide for storing a plurality of stacks of tabulating cards on which markings corresponding to meter readings are to be placed by the meter reader; to provide in a single container a working compartment for a stack of tabulating cards on which meter readings are to be placed and another compartment in which the stacks of tabulating cards on which meter readings are to be recorded can be located and thereabove the tabulating cards on which the markings have been placed can be received and maintained in proper condition; to provide still another compartment in the case for receiving cards that have been removed from the working compartment but, for some reason, should not be placed in the main storage compartment; to provide a removable lid or cover for the case having slots through which the cards can be inserted into the respective compartments; to provide for protecting the tabulating cards in the working compartment from the weather; to support the tabulating card carrying case in such manner that it can be carried by the meter reader and at the same time permit him to mark the uppermost card in the working compartment with the reading of the meter corresponding to the same; and to protect the outer surface of the case from injury as a result of handling by the meter reader and others.

Other objects of my invention will, in part, be obvious and in part appear hereinafter.

My invention is disclosed in the embodiment thereof shown in the accompanying drawings and it comprises the features of construction, combination of elements, and arrangement of parts which will be exemplified in the construction hereinafter set forth and the scope of the application of which will be indicated in the appended claims.

For a more complete understanding of the nature and scope of my invention, reference can be had to the following detailed description, taken together with the accompanying drawings, in which:

Figure 1 is a perspective view showing a tabulating card carrying case constructed in accordance with my invention and carried by a meter reader who is shown in position to mark the uppermost tabulating card with a meter reading;

Figure 2 is a view, in end elevation, showing the case in operative position;

Figure 3 is a view, in front elevation, of the tabulating card carrying case, a portion of the flap being broken away to show the rain cape enclosed therein;

Figure 4 is a view, in end elevation, of the card carrying case turned through 90° in a counter-clockwise direction as viewed in Figure 2 and showing the removable cover in the open position;

Figure 5 is a central vertical cross-sectional view of the card carrying case shown in Figure 2;

Figure 8 is a bottom plan view view of the card carrying case, the transparent cover over the same being broken away in order to reveal more clearly the special information carried by a card in an auxiliary compartment of the case which may be read by the meter reader when the case is turned upside down;

Figure 9 is a detail sectional view taken along the line 9—9 of Figure 11 and showing how a spring clip is employed to prevent accidental removal of the tabulating cards from the working compartment;

Figure 10 is a top plan view of the card carrying case with the rain cape in position over the working compartment; and Figure 11 is a top plan view of the card carrying case showing a card at the bottom of the working compartment on which is located a diagram of the streets to be covered by the meter reader in making his rounds.

Figure 6:
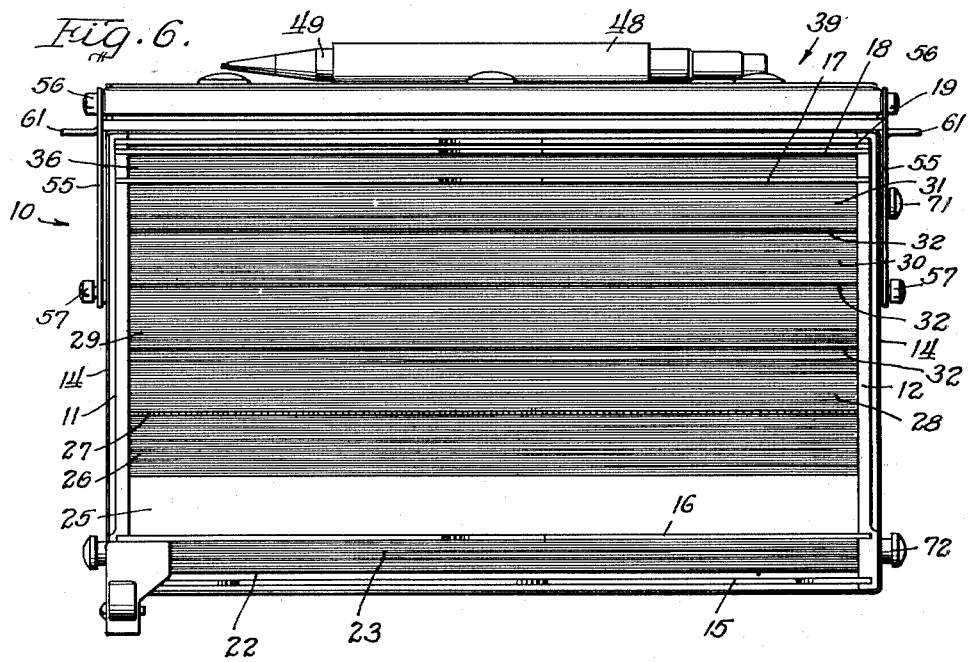
Figure 6 is a top plan view of the case as shown in Figure 4 and illustrating how the tabulating cards may be carried in the various compartments.

Referring now to the drawings, and particularly to Figures 5 and 6, it will be observed that reference character 10 designates, generally, a tabulating card carrying case in the form of a generally rectangular container which has end plates 11 and 12 and a back plate 13 formed of light weight metal, such as aluminum. In order to protect the case 10 in handling it is covered with leather 14 or similar material which may be secured by a suitable adhesive and which forms a soft and resilient surface which protects the case 10.

The case 10 is divided into four compartments by means of a masking plate 15, a divider or top plate 16, a divider or bottom plate 17, a divider plate 18 and a cover plate 19. The plates 15, 16, 17 and 18 are preferably formed of light weight material such as aluminum while the cover plate 19 is formed preferably of suitable transparent plastic material for a purpose which will be apparent hereinafter. As shown in Figure 6 these plates are located in suitable grooves in the end plates 11 and 12.

Figure 7:
Figure 7 is a top plan view of a typical tabulating card, the showing being at full scale.

The masking plate 15 and top plate 16 between them provide a working compartment 22 for receiving the stack 23 of tabulating cards, one of which is indicated, generally, at 24 in Figure 7. The cards in the stack 23 are to be marked by the meter reader as he reads the meter individual thereto.

A main compartment 25 is provided between the top and bottom plates 16 and 17. As illustrated, the main compartment 25 is substantially larger than the working compartment 22. It is provided to hold a stack 26 of tabulating cards that already have been marked. The stack 26 is separated by a separator card 27, preferably red for quick identification, from stacks 28, 29, 30 and 31 of tabulating cards which are to be marked by the meter reader. Separators 32 serve to divide the stacks 28, 29, 30 and 31 from each other.

It will be noted that the working compartment 22 is large enough to receive only a portion of any of the stacks 28, 29, 30 or 31 of tabulating cards. As will appear hereinafter the cards to make up the stack 23 in the working compartment 22 are taken from the cards immediately below the separator card 27 in the main compartment 25. It is important that they be kept in the proper order since they are arranged in the sequence in which the individual meters are read.

An auxiliary compartment 35 is provided by the bottom plate 17 and the divider plate 18. It is arranged to receive a stack 36 of cards which it is desired to keep separate from the cards in the stack 26 that have been marked and which will be processed directly by the tabulating machines when they are turned in by the meter reader. The cards in the stack 36 are placed here for various reasons. For example, it may not be possible to obtain entry to read the meter corresponding to the card. Accordingly, this particular card is placed in the auxiliary compartment 35. In some instances the meter reader may place certain information on a card which requires special handling. For example, he may wish to note that a meter cover is broken or that a seal has been tampered with. In such case the card containing this information requires special handling and is placed in the auxiliary compartment 35.

Underneath the auxiliary compartment 35 is a second auxiliary compartment 37 that is formed by the divider plate 18 and the cover plate 19. In the compartment 37 a card 38, Figure 8, is positioned which contains information that relates to particular meter installations. This is information which cannot be coded on the tabulating card, such as the card 24, Figure 7. Accordingly, an indication is provided on the tabulating card 24 that reference should be had to the card 38 in the compartment 37. This information is readily available to the meter reader merely by turning the case 10 upside down since the cover plate 19 is formed of transparent material.

As shown in Figures 5 and 6 of the drawings, a cover, indicated generally at 39, is arranged to be hinged and locked to the case 10. The cover 39 includes a liner 40, preferably formed of light weight metal such as aluminum, and it has down turned edges as illustrated more clearly in Figure 5. Like the remainder of the case 10 a covering 41 of leather is provided for the cover 39.

In the operative position of the case 10 the cover 39 occupies a vertical position as shown in Figure 5. It is provided with an upper slot 42 which opens into the main compartment 25 and a lower slot 43 which opens into the auxiliary compartment 35. The edges of the liner 40 in which the slots 42 and 43 are located are rounded, as shown, in order to facilitate entry of the cards edgewise. It will be observed that the slots 42 and 43 are located at the tops of their respective compartments 25 and 35. The reason for this is to insure that the cards will be inserted through the cover 39 so that they will fall on the top of the stacks therein. This permits insertion of the cards into the respective compartments without interference by the cards already present. As a further precaution in directing the cards through the lower slot 43 into the compartment 35 an angle member 44 is secured to the rear side of the liner 40 and it has a leg 45 which projects inwardly therefrom to guide the edge of the card directly into the compartment 35.

It will be recalled that a pencil having a special lead is required for marking the card 24. For this purpose a loop 48 of leather may be secured to the cover 39 for carrying a pencil 49 of the desired type. The loop 48, as shown in Figure 5, extends to form a flap 50 which may be secured at its upper edge by snap fasteners 51 to the cover 39. The flap 50 is provided to carry and protect the rain cape 52, Figure 3, which is formed of a transparent flexible type of material such as a transparent plastic. It has a strip 53 of heavy material, such as leather, secured along one edge that has apertures 54 therein for interfitting with the male portions of the snap fasteners 51. As shown in Figure 10, the rain cape 52 can be unfolded to extend over the working compartment 22 and thus protect the tabulating cards therein from the weather; it being understood that meter readers often are required to work in inclement weather and that, if the tabulating cards in the working compartment are not protected from rain and snow, they may absorb moisture and become useless for the intended purpose.

As illustrated in Figures 2, 3 and 4 of the drawings, the cover 39 is hinged to the case 10 by means of links 55. The links 55 are loosely pivoted on fillister headed screws 56 and 57, the former being located on the cover 39 and the latter on the end plates 11 and 12. As shown in Figure 4, the links 55 are sufficiently long to permit the cover 39 to be swung from the front of the case 10 to a position along the adjacent side. The cover 39 may be held in the closed position by means of locking links 58 which are loosely pivoted on screws 59 that are carried by the cover 39. Each of the locking links 58 has a slot 60 which is arranged to interfit with the screws 57 for holding the cover 39 in place. Out turned grip portions 61 are formed integrally with the locking links 58 to facilitate removal thereof from the screws 57 for opening the cover 39.

As illustrated in Figure 11 of the drawings, the masking plate 15 has a generally rectangular opening 62 which permits the meter reader to have access to the spaces on the card 24, Figure 7, corresponding to the digits of the respective meter dials. In addition an opening 63 also is provided in the masking plate 15 to afford the meter reader the opportunity of placing any special information he desires on the left central portion of the card 24. However, a sufficient portion of the masking plate 15 is provided to hold the stack 23 of cards therein as the case 10 is carried from meter to meter by the meter reader.

In Figure 11 there is shown a card 64 which normally is located at the bottom of the stack 23 of cards in the working compartment 22. It remains in this compartment and shows the particular route that the meter reader is to follow for reading the meters corresponding to the cards which he is carrying in the case 10. As indicated hereinbefore the cards are arranged in the order that the meters will be read. It is important that the meter reader have this information to assist him in properly covering his route.

It is desirable to provide some means for preventing the accidental removal of the cards from the working compartment 22. For this purpose a flat arm 65, Figure 9, may be provided which forms an integral part of a clip 66 that extends over the upper left hand edge of the cards in this compartment of the case 10 as viewed in Figure 11. The clip 66 is hinged at 67 on a U-shaped support 68 which is carried by the end plate 11. A spring 69 which reacts between the bottom of the support 68 and the underside of the clip 66 serves to bias the latter to the position shown in Figure 9. When it is desired to remove a card from the working compartment 22, the meter reader opens the spring clip 66.

With a view to facilitating the carrying of the case 10 by the meter reader, buttons 71 and 72, Figure 2, are provided on the end plate 11. A button 72' similar in position to the button 72 on the end plate 11 is provided on the opposite end plate 12. A strap 73 having suitable openings 74 near its ends may be secured thereby to the buttons at the opposite ends of the case 10. While the case 10 is being carried to the route, the strap 73 may be secured to the button 72 as shown in Figure 2 and to the similarly positioned button 72' at the opposite end. When the meter reader wishes to mark a reading on a tabulating card as illustrated in Figure 1, one end of the strap 73 is shifted to the button 71. As shown, the meter reader then is able to make the necessary markings on the tabulating cards in the working compartment 22 without interference from the strap 73.

When the meter reader receives the tabulating cards 24 corresponding to the meters on the route indicated on the card 64 which he is to read, he first arranges them in the order that the meters will be read. He determines this from experience or from an inspection of the route as indicated by the card 64. Each of the stacks 28, 29, 30 and 31 corresponds generally to a definite section of the route such as the cards in proper sequence corresponding to the meters located along the opposite sides of a street in a single block. The separator cards 32 are positioned between these different stacks in order to permit ready identification thereof. The cover 39 is opened and the stacks of tabulating cards corresponding to the meters to be read are positioned within the case 10. The cover 39 is closed and locked as described. The meter reader then proceeds to the route where the meters are to be read.

Before making the first reading, the meter reader opens the cover 39 and transfers a portion of the cards in the uppermost stack in the main compartment 25 to the working compartment 22. Also he shifts the strap 73 from the button 72 to the button 71. He is now ready to record the reading of the first meter.

This is accomplished by drawing a line with the special pencil 49 through the particular digit in the series of digits corresponding to the position of the pointer relative to the corresponding dial. In the tabulating card 24 illustrated in Figure 7 the first four rows of digits are for marking the kilowatt maximum demand indicated on a demand register. Ordinarily a demand register is not present in the meter of the usual householder. They usually are present in the meters of industrial establishments where the demand is a factor in the billing. The next four rows of digits correspond to the four dials of the conventional watthour meter that is universally provided for individual users. As indicated in Figure 7 the meter reader draws a line through the digit corresponding to the position of the pointer relative to the dial for each dial. After the reading has been recorded in this manner the marked card is removed from the working compartment 22 by operating the spring clip 66 to the open position and then it is inserted through the slot 42 in the cover 39 into the main compartment 25. As indicated hereinbefore if it was not possible to read the meter or if it is desired to withhold the card for any particular reason it may be inserted through the lower slot 43 into the auxiliary compartment 35.

If any particular information in regard to the reading of the meter is required which is not coded on the card corresponding to the next meter to be read, the meter reader turns the case 10 upside down and finds the necessary instructions on the card 38, Figure 8, as described hereinbefore. These special instructions may be of the nature as to whereabouts of the key for unlocking the dwelling or apartment to permit access to the meter, the presence of a dangerous dog and like special information.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim as my invention:

1. A case for carrying rectangular tabulating cards comprising a rectangular container having end walls and open for its full extent along one side thereof, a pair of spaced apart partitions in said container and rigidly secured to the end walls thereof, one each of said partitions being closely disposed adjacent the top and bottom of said case to define a relatively shallow working compartment adjacent the top of said case and a relatively shallow auxiliary compartment adjacent the bottom of said case, said partitions defining therebetween a storage compartment of appreciably greater height than the combined height of said working and auxiliary compartments, an exposed freely accessible cover closing the open side of said case, a pair of spaced apart slots, one each extending longitudinally of said cover adjacent the top and bottom thereof and communicating respectively with the top of said storage compartment and the top of said auxiliary compartment, and hinge means connected between said cover and the outer surface of said end walls effective to swing said cover from its closed position to a position beneath the bottom of said container.

2. The invention as set forth in claim 1, wherein the working compartment is open along one side of the container, a spring clip secured to one transverse edge of said container, and a depending member on said spring clip for engagement in front of the marginal edges of the cards in said working compartment along the open side thereof to prevent accidental removal of said cards.

3. The invention as set forth in claim 1, wherein the hinge means comprise links pivoted to the cover adjacent its top and to the container adjacent its bottom, and locking links pivoted to said cover adjacent the bottom thereof and having locking connection with the pivot of the hinge on said container.

ALBERT J. COLLINS.

REFERENCES CITED

The following references are of record in the file of this patent:

UNITED STATES PATENTS

| Number | Name | Date |
|---|---|---|
| 356,810 | Weeks | Feb. 1, 1887 |
| 1,240,621 | Story | Sept. 18, 1917 |
| 1,613,440 | Carek | Jan. 4, 1927 |
| 1,752,989 | Hennessy | Apr. 1, 1930 |
| 1,826,991 | Carroll et al. | Oct. 13, 1931 |